US006799146B1

(12) United States Patent
Lang

(10) Patent No.: US 6,799,146 B1
(45) Date of Patent: Sep. 28, 2004

(54) METHOD FOR REMOTE ON-LINE ADVISORY DIAGNOSTICS AND DYNAMIC HEAT RATE WHEN USED FOR INPUT/LOSS PERFORMANCE MONITORING OF A POWER PLANT

(75) Inventor: Fred D Lang, San Rafael, CA (US)

(73) Assignee: Exergetic Systems LLC, San Rafael, CA (US)

( * ) Notice: Subject to any disclaimer, the term of this patent is extended or adjusted under 35 U.S.C. 154(b) by 194 days.

(21) Appl. No.: 10/179,670

(22) Filed: Jun. 24, 2002

Related U.S. Application Data

(63) Continuation-in-part of application No. 09/630,853, filed on Aug. 2, 2000, and a continuation-in-part of application No. 09/273,711, filed on Mar. 22, 1999, which is a continuation-in-part of application No. 09/047,198, filed on Mar. 24, 1998, now abandoned, which is a continuation-in-part of application No. 09/827,956, filed on Apr. 4, 2001, which is a continuation-in-part of application No. 09/759,061, filed on Jan. 11, 2001, which is a continuation-in-part of application No. 09/273,711, which is a continuation-in-part of application No. 10/087,879, filed on Mar. 1, 2002, which is a continuation-in-part of application No. 09/971,527, filed on Oct. 5, 2001, and a continuation-in-part of application No. 09/827,956, and a continuation-in-part of application No. 09/630,853, and a continuation-in-part of application No. 09/273,711, which is a continuation-in-part of application No. 10/131,932, filed on Apr. 24, 2002

(60) Provisional application No. 60/147,717, filed on Aug. 6, 1999.

(51) Int. Cl.[7] ............................ G06F 11/30; G06F 15/00
(52) U.S. Cl. ....................................... 702/183; 700/274
(58) Field of Search ...................... 702/22–25, 30–32, 702/45, 50, 182–185, 187, 188; 165/11.1; 431/12; 700/27, 86, 274, 275, 282, 287; 708/2; 73/35.02, 112, 113

(56) References Cited

U.S. PATENT DOCUMENTS

| | | | | |
|---|---|---|---|---|
| 5,181,452 A | * | 1/1993 | Immega | ........................ 91/418 |
| 5,181,482 A | * | 1/1993 | Labbe et al. | ................. 122/392 |
| 6,453,731 B1 | * | 9/2002 | Yaegashi | ...................... 73/113 |
| 6,658,372 B2 | * | 12/2003 | Abraham et al. | ........... 702/183 |

OTHER PUBLICATIONS

F.D. Lang, and K.F. Horn, "Fuel Consumption Index for Proper Monitoring of Power Plants", Proceedings of the 1991 Heat Rate Improvement Conference, Scottsdale, AZ, sponsored by the Electric Power..Research Institute, Palo Alto, CA, May 7–9, 1991. Same as Rev. 10, Oct. 6, 1998, available from Exergetic Systems, Inc., San Rafael, CA but with additional material.

(List continued on next page.)

Primary Examiner—Marc S. Hoff
Assistant Examiner—Manuel Barbee

(57) ABSTRACT

The operation of a fossil-fueled thermal system is quantified by a method for continuously monitoring the thermal system at a location remote from the system, advising the system operator of corrections, improvements and warnings which improve system operations, such advise may include diagnostic information, Dynamic Heat Rate and notice of tube failures.

16 Claims, 8 Drawing Sheets

OTHER PUBLICATIONS

F.D. Lang, and K.F. Horn, "Practical Experience with Second Law Power Plant Monitoring" in Energy for the Transition Age (Proceedings of the Florence World Energy Research Symposium Jun. 7–12, 1992, Florence, Italy), Edited by S.S. Stecco, Nova Science Pub., Inc., Commack, NY, 1992, pp. 487–501.

F.D. Lang, and K.F. Horn, "Practical Experience with Second Law Power Plant Monitoring" in Advances in Power Engineering (Proceedings of International Power Engg. Conf., May 17–21, 1992, Hangzhou, China), Ed.Cen Kefa and D.Lou, International Academic Publishers, Beijing, China, 1992, pp. 68–77.

H.C. Boyle, F.D. Lang, K.F. Horn and M.L. Jones, "Exergy Audits of Thermal Power Cycles", Proceedings of International Symposium on Performance Improvement, Retrofitting and Repowering of Fossil Fuel Power Plants (GEN–UPGRADE 90), Washington DC, sponsored by the Electric Power Research Institute, Palo Alto, California, Mar. 6–9, 1990.

* cited by examiner

METHOD FOR REMOTE ON-LINE ADVISORY DIAGNOSTICS AND DYNAMIC HEAT RATE WHEN USED FOR INPUT/LOSS PERFORMANCE MONITORING OF A POWER PLANT

This application is a Continuation-In-Part of pending U.S. patent application Ser. No. 09/273,711 filed Mar. 22, 1999, for which priority is claimed and is incorporated herein by reference in its entirety; application Ser. No. 09/273,711 which, in tun, is a Continuation-In-Part of U.S. patent application Ser. No. 09/047,198 filed Mar. 24, 1998, now abandoned for which priority is claimed.

This application is also a Continuation-In-Part of pending U.S. patent application Ser. No. 09/630,853 filed Aug. 2, 2000, for which priority is claimed and is incorporated herein by reference in its entirety; application Ser. No. 09/630,853 claims the benefit of U.S. Provisional Patent Application Serial No. 60/147,717 filed Aug. 6, 1999, for which priority is claimed.

This application is also a Continuation-In-Part of pending U.S. patent application Ser. No. 09/827,956 filed Apr. 4, 2001, for which priority is claimed and is incorporated herein by reference in its entirety; application Ser. No. 09/827,956 which, in tun is a Continuation-In-Part of pending U.S. patent application Ser. No. 09/759,061 filed Jan. 11, 2001, for which priority is claimed and is incorporated herein by reference in its entirety; application Ser. No. 09/759,061 which, in turn, is a Continuation-In-Part of pending U.S. patent application No. 09/273,711 filed Mar. 22, 1999, for which priority is claimed and is incorporated herein by reference in its entirety; application Ser. No. 09/273,711 which, in tun, is a Continuation-In-Part of U.S. patent application Ser. No. 09/047,198 filed Mar. 24, 1998, now abandoned for which priority is claimed.

This application is also a Continuation-In-Part of pending U.S. patent application Ser. No. 10/087,879 filed Mar. 1, 2002, for which priority is claimed and is incorporated herein by reference in its entirety; application Ser. No. 10/087,879 which, in turn, is a Continuation-In-Part of pending U.S. patent application No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 2, 1998, now abandoned for which priority is claimed application Ser. No. 10/087,879 is also a Continuation-In-Part of pending U.S. patent application Ser. No. 09/630,853 filed Aug. 2, 2000, for which priority is claimed and is incorporated herein by reference in its entirety; application Ser. No. 09/630,853 claims the benefit of U.S. Provisional Patent Application Serial No. 60/147,717 filed Aug. 6, 1999, for which priority is claimed. Application Ser. No. 10/087,879 is also a Continuation-In-Part of pending U.S. patent application Ser. No. 09/827,956 filed Apr. 4, 2001, for which priority is claimed and is incorporated herein by reference in its entirety; application Ser. No. 09/827,956 which, in turn, is a Continuation-In-Part of pending U.S. patent application Ser. No. 09/759,061 filed Jan. 11, 2001, for which priority is claimed and is incorporated herein by reference in its entirety; application Ser. No. 09/759,061 which, in turn, is a Continuation-In-Part of pending U.S. patent application Ser. No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed; application Ser. No. 10/087,879 is also a Continuation-In-Part of pending U.S. patent application Ser. No. 09/971,527 filed Oct. 5, 2001, for which priority is claimed and is incorporated herein by reference in its entirety; application Ser. No. 09/971,527 which, in turn, is a Continuation-In-Part of pending U.S. patent application Ser. No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed; application Ser. No. 09/971,527 is also a Continuation-In-Part of pending U.S. patent application Ser. No. 09/630,853 filed Aug. 2, 2000, for which priority is claimed and is incorporated herein by reference in its entirety; application Ser. No. 09/971,527 is also a Continuation-In-Part of pending U.S. patent application Ser. No. 09/827,956 filed Apr. 4, 2001, for which priority is claimed and is incorporated herein by reference in its entirety; application Ser. No. 09/827,956 which, in turn, is a Continuation-In-Part of pending U.S. patent application Ser. No. 09/759,061 filed Jan. 11, 2001, for which priority is claimed and is incorporated herein by reference in its entirety; application Ser. No. 09/759,061 which, in turn, is a Continuation-In-Part of pending U.S. patent application Ser. No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed.

This application is also a Continuation-in-Part of pending U.S. patent application Ser. No. 10/131,932 filed Apr. 24, 2002, for which priority is claimed and is incorporated herein by reference in its entirety; application Ser. No. 10/131,932 which, in turn, is a Continuation-In-Part of pending U.S. patent application Ser. No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed; application Ser. No. 10/131,932 is also a Continuation-In-Part of pending U.S. patent application Ser. No. 09/630,853 filed Aug. 2, 2000, for which priority is claimed and is incorporated herein by reference in its entirety; application Ser. No. 09/630,853 claims the benefit of U.S. Provisional Patent Application Serial No. 60/147,717 filed Aug. 6, 1999, for which priority is claimed; application Ser. No. 10/131,932 is also a Continuation-In-Part of pending U.S. patent application Ser. No. 10/087,879 filed Mar. 1, 2002, for which priority is claimed and is incorporated herein by reference in its entirety; application Ser. No. 10/087,879 which, in turn, is a Continuation-In-Part of pending U.S. patent application Ser. No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed. Application Ser. No. 10/087,879 is also a Continuation-In-Part of pending U.S. patent application Ser. No. 09/630,853 filed Aug. 2, 2000, for which priority is claimed and is incorporated herein by reference in its entirety; application Ser. No. 09/630,853 claims the benefit of U.S. Provisional Patent Application Serial No. 60/147, 717 filed Aug. 6, 1999, for which priority is claimed. Application Ser. No. 10/087,879 is also a Continuation-In- Part of pending U.S. patent application Ser. No. 09/827,956 filed Apr. 4, 2001, for which priority is claimed and is incorporated herein by reference in its entirety; application Ser. No. 09/827,956 which, in turn, is a Continuation-In-Part of pending U.S. patent application Ser. No. 09/759,061 filed Jan. 11, 2001, for which priority is claimed and is incorporated herein by reference in its entirety; application Ser. No. 09/759,061 which, in turn, is a Continuation-In-Pat of pending U.S. patent application No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed. Application Ser. No. 10/087, 879 is also a Continuation-In-Part of pending U.S. patent application Ser. No. 09/971,527 filed Oct. 5, 2001, for which priority is claimed; application Ser. No. 09/971,527 which, in turn, is a Continuation-In-Part of pending U.S. patent application Ser. No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed; application Ser. No. 09/971,527 is also a Continuation-In-Part of pending U.S. patent application Ser. No. 09/630,853 filed Aug. 2, 2000, for which priority is claimed and is incorporated herein by reference in its entirety; application Ser. No. 09/971,527 is also a Continuation-In-Part of pending U.S. patent application Ser. No. 09/827,956 filed Apr. 4, 2001, for which priority is claimed; application Ser. No. 09/827,956 which, in turn, is a Continuation-In-Part of pending U.S. patent application Ser. No. 09/759,061 filed Jan. 11, 2001, for which priority is claimed and is incorporated herein by reference in its entirety; application Ser. No. 09/759,061 which, in turn, is a Continuation-In-Part of pending U.S. patent application No. 09/273,711 filed Mar. 22, 1999, for which priority is claimed and is incorporated herein by reference in its entirety; application Ser. No. 09/273,711 which, in turn, is a Continuation-In-Part of U.S. patent application Ser. No. 09/047,198 filed Mar. 24, 1998, for which priority is claimed.

This invention relates to a fossil-fired thermal system such as a power plant or steam generator, and, more particularly, to a method for continuously monitoring the thermal system at a location remote from the system, advising the system operator of corrections, improvements and warnings which improve system operations. Such advise may include diagnostic information, Dynamic Heat Rate and notice of tube failures.

BACKGROUND OF THE INVENTION

Although especially applicable to "Input/Loss methods" installed at coal-fired power plants, this invention is applicable to any other heat rate method installed at a thermal system for on-line monitoring; said method monitoring in a continuous manner (i.e., on-line) resulting in the determination of one or more of the following quantities: fuel flow, effluent flow, emission rates, fuel chemistry, fuel heating value, boiler efficiency, and/or system heat rate. Note that "The Input/Loss Method" and its associated technologies are described in the following U.S. patent applications Ser. No. 09/273,711 (hereinafter termed '711), Ser. No. 09/630,853 (hereinafter termed '853), Ser. No. 09/827,956 (hereinafter termed '956), Ser. No. 09/759,061 (hereinafter termed '061), Ser. No. 10/087,879 (hereinafter termed '879), and Ser. No. 10/131,932 (hereinafter termed '932); and in their related provisional patent applications and Continuation-In-Parts. One of several rudimentary Input/Loss methods is described in U.S. Pat. No. 5,367,470 issued Nov. 22, 1994 (hereinafter termed '470), and in U.S. Pat. No. 5,790,420 issued Aug. 4, 1998 (hereinafter termed '420).

The importance of accurately determining system heat rate is critical to any thermal system (heat rate being inversely related to system thermal efficiency, common units of measure being Btu/hour per kilowatt, or Btu/kWh). If practical hour-by-hour reductions in heat rate are to be made, and/or problems in thermally degraded equipment are to be found and corrected, then accuracy in determining system heat rate is a necessity as well as the quality of diagnostic information made available associated with degraded equipment. Any on-line monitoring method determining system heat rate must be properly maintained by the system's engineering staff. However, de-regulation of the electric power industry and/or economic down-turns may result in reductions of such engineering staffs. Further, the expertise needed to solve all problems arising at a thermal system may not be immediately available to the local staff. Further, given complexities of most thermal systems, and especially large commercial power plants burning coal, the system operator must keep track of dozens of important parameters which might impact system heat rate. The system operator has had no single parameter which feedbacks in real-time the consequences of his/her latest adjustments made to the system.

The problem of coping with complex thermal systems, and especially large commercial power plants burning coal, has never been adequately been address by the industry. A system operator would desire to have feedback on individual equipment, given adjustments to that equipment, as to how it impacts system heat rate. For example: if hot reheat temperature is lowered by the operator, what is the impact on system heat rate? Solution to such problems includes developing differential heat rates ($hr_j$) for individual equipment and processes (e.g., $hr_{Reheat}$ for the Reheater heat exchanger, $hr_{Comb}$ for the combustion process, etc.). One attempt to provide such operator feedback, as established art, is the use of the "controllable parameters" method to determine differential heat rates. In this method, a few (typically less than a dozen) measured system parameters are monitored relative to a reference value (also termed a bogey value or targeted value). For a turbine cycle associated with a conventional power plant, controllable parameters include at least throttle pressure, throttle temperature, reheat temperature and condenser pressure. For the boiler, controllable parameters may include stack tempers, excess air and/or Air/Fuel ratio. One teaching, known to the inventor, of controlling the Air/Fuel ratio to gain improvement in boiler performance is U.S. Pat. No. 4,969,408 by DH Archer and M Ahmed, issued Nov. 13, 1990.

In general, to assure quality feedback to the operator, differential heat rates should sum to system heat rate: $\Sigma hr_j = HR$; thus assuring that individual effects consistently impact the system as a whole. The problem is that current industrial practice, including the controllable parameters approach, computes differential heat rates in isolation. For example, the effects of changing hot reheat temperature is typically established by computer simulation of a turbine cycle, holding boiler efficiency constant, said effects then being assigned to the entire system. In like manner, boiler parameters are altered in computer simulators without consideration to effects on the turbine cycle. Even if such practices were applied to a system which maintains constant power output, burning uniform fuel environmental conditions alter with the seasons effecting such sensitivities. Coal-fired systems commonly operate with variable load and highly variable fuel quality. Indeed, use of such differential heat rates, computed in isolation, is the only known modality for on-line monitoring of thermal systems, with the exception of The Input/Loss Method. When the impacts of controllable parameters are computed in isolation, turbine cycle differential heat rates or boiler Δefficiencies have little value, offering no consistent feedback to the operator.

Whereas The Input/Loss Method, when employing the Fuel Consumption Index (FCI) technique, addresses a portion of the problem of determining differential heat rates; the FCI technique does not compute $hr_j$ values in isolation. The FCI technique, as establish art, computes differential heat rates based on principles founded in the Second Law of thermodynamics. The FCI technique forces system integration; $hr_j$ effects will always sum to system heat rate. However, a limiting requirement of the FCI technique is that it requires knowledge of the constituents of the As-Fired fuel, As-Fired fuel heating value, system mass balances (i.e., fuel, combustion gases and working fluid), and routine system "Operating Parameters".

References for the Fuel Consumption Index technique include the following: F. D. Lang, and K. F. Horn, "Fuel Consumption Index for Proper Monitoring of Power Plants", *Proceedings of the 1991 Heat Rate Improvement Conference*, Scottsdale, Ariz., sponsored by the Electric Power Research Institute, Palo Alto, Calif., May 7–9, 1991; also published as "Practical Experience with Second Law Power Plant Monitoring" in *Energy for the Transition Age* (Proceedings of the Florence World Energy Research Symposium, FLOWERS '92, Jun. 7–12, 1992, Florence, Italy), Edited by Sergio S. Stecco, Nova Science Publishers, Inc., Commack, N.Y., 1992, pages 487–501, ISBN 1-56072-083-4; also published as "Practical Experience with Second Law Power Plant Monitoring" in *Advances in Power Engineering* (Proceedings of International Power Engineering Conference, May 17–21, 1992, Hangzhou, People's Republic of China), Edited by Cen Kefa and David Y. S. Lou, International Academic Publishers, Beijing, China, 1992, pages 68–77, ISBN 7-80003-190-X/TK-17; also "Fuel Consumption Index for Proper Monitoring of Power Plants" is publically available, with updates through Revision 10 of Oct. 6, 1998, from Exergetic Systems, Inc., San Rafael, Calif. (note that this Revision 10 reflects all prior related technologies published elsewhere).

There is no known art related to this invention. There is, however, a clear need to improve the quality and consistency of information provided to operators of thermal systems, especially to those of coal-fired power plants, and to assist them in improving system heat rate.

SUMMARY OF THE INVENTION

This invention relates to a fossil-fired thermal system such as a power plant or steam generator, and, more particularly, to a method for continuously monitoring the thermal system at a location remote from the system, causing corrections, improvements and warnings of tube failures to be made by providing performance diagnostic information to the system operator including Dynamic Heat Rate.

This invention addresses the problems discussed by teaching remote monitoring techniques and through use of Dynamic Heat Rate, providing quality and consistent operator feedback for improving system heat rate. Although the general concept and use of system heat rate is common art in the electric power industry, having been in use since at least the 1930s, there is no known reference in the literature to the Dynamic Heat Rate concept. The works of '470 and '420 make no mention of Dynamic Heat Rate. Although the technologies of '711, '853, '956, '061, '879 and '932 support this invention, enhancing the quality of diagnostic information provided to the system operator, they make no mention of Dynamic Heat Rate, nor of remote diagnostics.

Given that the FCI technique requires knowledge of the constituents of the As-Fired fuel, As-Fired fuel heating value, system mass balances especially As-Fired fuel flow, and routine system Operating Parameters, to apply the FCI technique to systems in which such information is not directly available, this invention teaches to combine FCI techniques with Input/Loss methods and with continuous monitoring techniques, leading to quality and consistent operator feedback for improving system heat rate. In the preferred embodiment the FCI technique requires The Input/Loss Method as taught in '711 and '879, with high accuracy boiler efficiencies as taught in '853, with general support found in '956 and '061, with tube failure detection methods taught in '932; or equivalent Input/Loss methods.

However, actual applications of The Input/Loss Method at coal-fired systems as revealed that computed FCIs and system heat rates may produce considerable data scatter. This has been found true, at certain times, for systems burning low quality or variable quality coals; such coals include at least: sub-bituminous C, Powder River Basin coals, lignites and brown coals. For such systems this scatter may be significant enough to preclude useful information being presented, or otherwise absorbed, by the operator to act in an appropriate manner (FIG. 1 illustrates such scatter, discussed below). If the electric power industry is to burn fossil fuels more efficiently, thus reducing emission flows, which is especially sensitive at systems burning poor quality coal, then improvement is needed. Indeed, what is needed is a straightforward presentation of the effects an operator causes, which, as taught by this invention, is Dynamic Heat Rate.

This invention adds to the technology associated with Input/Loss methods. As taught in '711, '853, '879 and '932, The Input/Loss Method has been applied through computer software, installable on a personal or other computer termed a "Calculational Engine", and has been demonstrated as being highly useful to power plant engineers. This invention teaches to connect the Calculational Engine with a personal or other computer termed a "Remote Engine". The Remote Engine receives data from, and sends data to, the Calculational Engine. The Calculational Engine continuously determines system heat rate, Fuel Consumption Indices, differential heat rates based on Fuel Consumption Indices, Dynamic Heat Rate, and other thermal performance information in essentially "real-time" (on-line), as long as the thermal system is burning fuel. The Remote Engine, receiving such information, prepares appropriate diagnostic information which can be easily interpreted by the system operator when such information is sent back to the Calculational Engine. Such diagnostic information may consist of changes in correction factors associated with effluent measurements; such correction factors being taught in '879. Such diagnostics information may consist of at least warnings to the system operator that his/her latest actions have a detrimental effect on system heat rate. Also, the Remote Engine may send diagnostic information related to tube failures to the system operator; such tube failure methods being taught by '932. The application of this invention to The Input/Loss Method, installed as part of the Calculational Engine and the Remote Engine, significantly enhances the power plant operator's ability to improve system heat rate.

It is therefore an important object of the present invention to teach how Dynamic Heat Rate is determined.

It is therefore a further object of the present invention, to demonstrate how Dynamic Heat Rate leading to consistent differential heat rates may be used to improve system heat rate.

It is therefore a further object of the present invention to teach how the Calculational Engine, producing Dynamic Heat Rate, tube failure warnings and diagnostics, and other thermal performance information, and the Remote Engine, communicate electronically.

Other objects and advantages of the present invention will become apparent when its general methods are considered in conjunction with the accompanying drawings and the related inventions of '711, '853, '956, '061, '879 and '932.

DESCRIPTION OF THE PREFERRED EMBODIMENT

Figure 1:
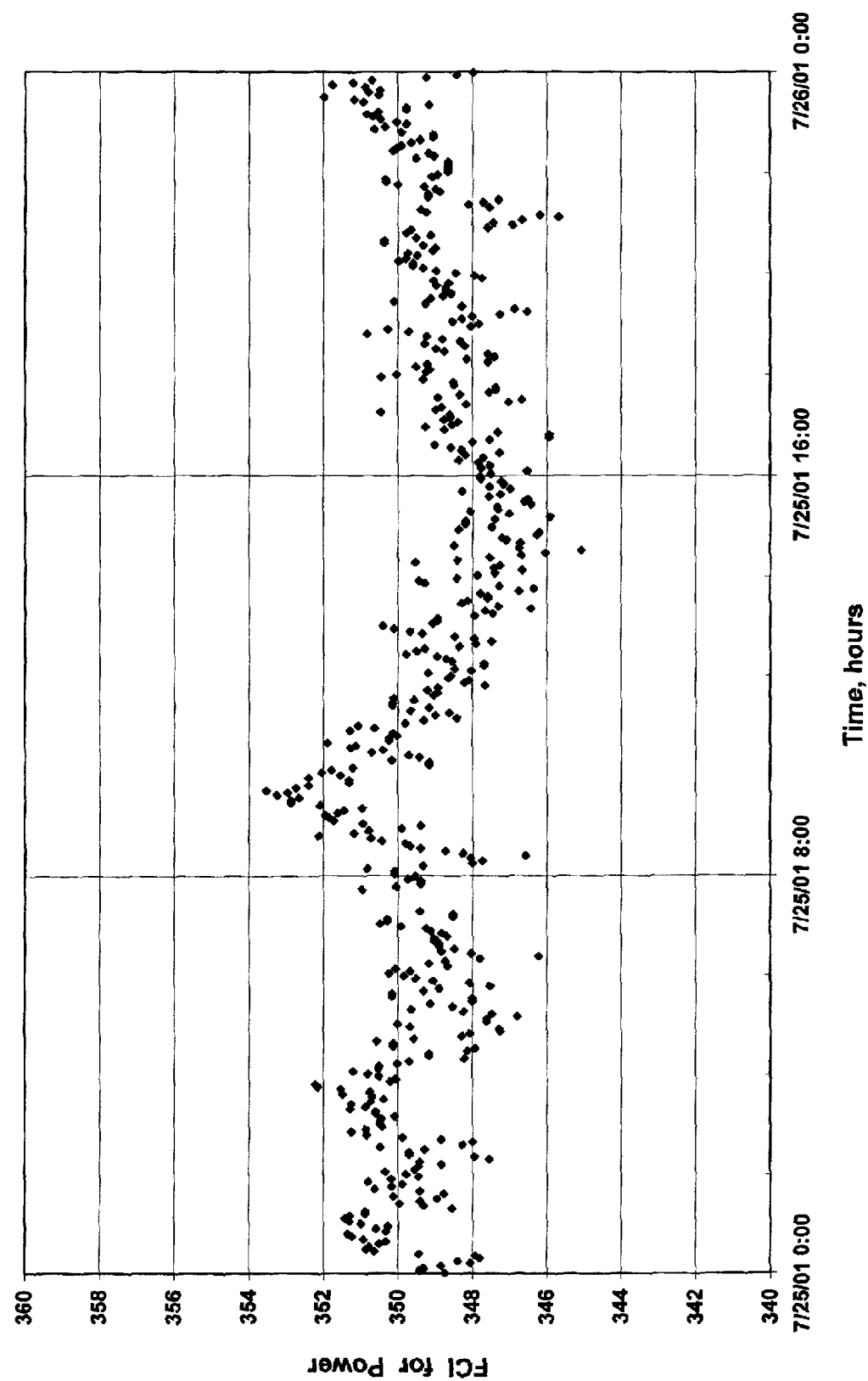
FIG. 1 is a plot of actual Fuel Consumption Indices for power, produced from a Calculational Engine using The Input/Loss Method installed at a power plant burning Powder River Basin coal.

To assure an appropriate teaching of this invention, its description is divided into sub-sections. The first nomenclature, definitions of equation terms and typical units of measure. The next sub-section disc Fuel Consumption Indices as the provide the calculational base for both accurate system heat rate and consistent differential heat rates. Subsequent sub-sections define Dynamic Heat Rate, teach the mechanisms of communications between the Calculational Engine and the Remote Engine, and provide a summary. Conflicts arising between this invention and '711, '853, '956, '061, '879, '932 and their related provisional patent applications and Continuation-In-Parts are resolved in favor of the technology herein.

Definitions of Equation Terms with Typical Units of Measure

BBTC=Energy flow derived directly from the combustion process and delivered to the working fluid; Btu/hr.

$FCI_j$=Fuel Consumption Index associated with any specific jth component or process; for example: combustion process, $FCI_{Comb}$; reheater heat exchanger, $FCI_{Reheat}$; the direct creation of electricity (power process), $FCI_{Power}$, etc.; $\Sigma FCI_j$=1000; unitless.

$g_{Fuel}$=Specific exergy of As-Fired fuel; Btu/lbm.

$G_{in}$=Total exergy flow and shaft power input to the thermal system; Btu/hr.

$\Sigma G_{misc}$=Summation of miscellaneous exergy flows inlet and outlet from the system such as a steam-air heater, system water losses, water makeup, etc.; Btu/hr.

HBC=Firing Correction; Btu/$lbm_{AF}$.

HHV=As-Fired higher heating value determined by The Input/Loss Method, also termed the gross calorific value; Btu/$lbm_{AF}$.

HHVP=As-Fired higher heating value, based on HHV and used in system evaluations, as corrected for a constant pressure process; Btu/$lbm_{AF}$.

HR=System heat rate (HHV- or LHV-based), also unit heat rate; Btu/kWh. =3412.1416/$\eta_{System}$ $hr_i$=Differential heat rate (HHV- or LHV-based) associated with a specific ith component or process having irreversible loss (non-power, without the environmental term); for example: combustion process, $hr_{Comb}$; reheater heat exchanger, $hr_{Reheat}$; ΔBtu/kWh.

$hr_j$=Differential heat rate (HHV- or LHV-based) associated with any specific jth component or process, including the power process and environment terms; ΔBtu/kWh.

$I_i$=Irreversibility associated with a specific ith component or non-power process; for example: combustion process, $I_{Comb}$; reheater heat exchanger, $I_{Reheat}$; etc.; Btu/hr.

LHV=As-Fired lower heat value determined by The Input/Loss Method, also termed the net calorific value; Btu/$lbm_{AF}$.

LHVP=As-Fired lower heating value, based on LHV and used in system evaluations, as corrected for a constant pressure process; Btu/$lbm_{AF}$.

M=Total number of time steps employed for quadrature; unitless.

$m_{AF}$=As-Fired fuel mass flow rate (i.e, wet with water and fuel mineral matter); $lbm_{AF}$/hour.

$m_{Air}g_{Air}$=Total exergy of moist combustion air inlet to the system; Btu/hr.

N=One-quarter the system's natural periodicity, in time steps; unitless.

n=Current time step (i.e., associated with the latest monitoring system report); unitless.

∂Q=Incremental heat transfer, Btu/hr.

t=Time ($t_S$ is start time, $t_E$ is end time for quadrature); minutes.

$\Delta t_k$=The kth evaluated time difference taken between n and n−1 time steps; minutes.

T=Temperature of fluid, degree F.

$T_{Ref}$=Temperature of reference conditions, degree F.

∂W=Incremental shaft power, Btu/hr.

$\Sigma W_{Fan}$=Summation of shaft powers supplied to the boiler combustion gases and combustion air (typically the Forced Draft and Induced Draft fans); Btu/hr.

$\Sigma W_{Pump}$=Summation of pump shaft powers supplied to the boiler and turbine cycle; Btu/hr.

$W_{output}$=Gross electrical generation, Btu/hr or kilowatts.

λ=Natural periodicity of the thermal system; minutes.

$\eta_{B-HHV}$=Boiler efficiency (HHV-based); unitless.

$\eta_{B-LHV}$=Boiler efficiency (LHV-based); unitless.

$\eta_{System}$=System thermal efficiency, corresponding to $\eta_{B-HHV}$ or $\eta_{B-HHV}$; unitless.

$\xi_k$=Time weighting function for the kth evaluated time step; unitless.

Fuel Consumption Indices

This invention enhances any on-line monitoring system which determines system heat rate. The classical definition of system heat rate for an electrical power plant, having units of measure in Btu/kWh, is defined by the following assuming a higher heating value base, where realized power when used to compute heat rate, $W_{Power}$, has units of measure in kilowatts:

$$HR = 3412.1416/\eta_{System} \quad (1)$$

$$= m_{AF}(HHVP + HBC)/W_{Output} \quad (2)$$

$$= BBTC/(\eta_{B-HHV}W_{output}) \quad (3)$$

Non-traditional methods for computing and/or estimating system heat rate are taught in '956 and '061. The preferred embodiment is based on The Input/Loss Method and its computed system heat rate as taught in '711 and '879, employing a computed boiler efficiency as taught in '853. An important teaching of this invention is the reporting of tube failures to system operators, said failures taught by '932. Further, it is preferred, to fully implement the advantages of this invention, that The Input/Loss Method produce Fuel Consumption Indices (FCIs). Alternatively, FCI may be computed by any of the available Input/Loss methods, or any other heat rate method, which determines fuel chemistry, heating value and fuel flow on-line.

As established art, use of the Second Law-based concept of exergy offers a foundation from which problems of providing the system operator consistent information may be developed. Of the total exergy and power inputs to a system, only thermodynamic irreversibilities and power output will result. This is expressed by Eq.(5), where the total exergy and shaft power inputs to the system, $G_{in}$, is defined in Eq.(4). Specific exergies, g, used to define $G_{in}$ are composed of physical, chemical and thermal contributions; subscript i denoting non-power processes.

$$G_{in}=m_{AF}g_{Fuel}+m_{Air}g_{Air}\Sigma G_{Misc}+\Sigma W_{Pump}+\Sigma W_{Fan} \quad (4)$$

$$G_{in}=\Sigma I_i+W_{output} \quad (5)$$

Eq.(5) represents a clear statement of the Second Law applied to a thermal system. From this concept the Fuel Consumption Index is developed by dividing through by $G_{in}$ for individual components or processes, including the production of power (the power process). Note, as developed below, see accounting of power terms, inputs versus the actual output ($W_{output}$), is important when implementing these concepts for operator feedback.

Fuel Consumption Index is a unitless measure of fuel consumed as assigned thermodynamically to those individual components or processes responsible for fuel consumption, given a system's production of power. It quantifies the exergy and power consumption of all components and processes relative to the total exergy and power supplied to the system, by far the predominate term being the fuel's total exergy, $m_{AF}g_{Fuel}$. Based on Eq.(5), FCI is defined for non-power processes and components by the following:

$$FCI_j=1000\ I_j/G_{in} \quad (6)$$

and for the power production process as:

$$FCI_{Power}=1000\ W_{output}/G_{in} \quad (7)$$

The power process is the direct creation of electricity; non-power processes are all others, those producing irreversible losses (e.g., the combustion process and heat exchangers). As used in Eqs.(6) & (7) the terms $G_{in}$, irreversibility and power all employ units of Btu/hr, thus FCI is unitless. FCIs are arbitrarily multiplied by 1000. Therefore, based on Eq.(5), $\Sigma FCI_j=1000$ (where j represents all components and processes). By definition, the environment as a "process" can not produce a net irreversible loss, nor a $\int \partial W$ quantity, thus $FCI_{Envir}=0.0$. Since FCIs sum to 1000 for conservation of Eq.(5), consistency needed for operator presentation is inherent; therefore decreases in the FCIs of one set of components means increases in the FCIs of other components. Thus the operator is assured of finding causes and effects within the system. For example, if the boiler's economizer $FCI_{Econ}$ decreases from 210 to 200 (i.e., lower irreversible losses), which is just offset by an increase in the power $FCI_{Power}$, with no other changes, the operator has assurance that less fuel is being used to produce each kilowatt of power, thus validating his/her most recent action which effected the economizer. The operator must seek to maintain the highest $FCI_{Power}$ possible, by minimizing irreversible FCIs throughout the system.

Irreversibility is the unrecoverable thermodynamic loss associated with any process, the loss of potential power from the system. At the system level, irreversibilty is a measure of the exergy destroyed and thus is directly proportional to fuel consumption. It is the difference between the total exergy and actual shaft power inputs, less actual power output. Irreversibility is defined, for a process or system, by the following:

$$I=\int (1.0-T_{Ref}/T)\partial Q - \int \partial W - \int mdg \quad (8)$$

Eq.(8) is an accounting of potential power losses from a process. The $\int(1.0-T_{Ref}/T)\partial Q$ term is the Carnot conversion of energy flow to power, via the motive $\int \partial Q$ heat transfer, a negative term if from the process. The Carnot conversion can be thought of as the equivalent of the exergy resultant from heat transferred from the process directly to the environment. The $\int \partial W$ and $\int mdg$ terms represent the difference between actual shaft power (produced or supplied), and the actual exergy change of the process (potential power supplied to or produced from the fluid), thus a net lost in potential power. The sign of $\int \partial W$ is positive if power is produced by the system.

Differential heat rate, used as preferred embodiment, is determined for individual components and processes consistent with both First and Second Law concepts. Differential heat rate, $hr_i$, is defined for irreversible components and non-power processes by the following ($W_{output}$ in kilowatts):

$$hr_i=3412.1416\ FCI_i m_{AF}(HHVP+HBC)/(1000\ W_{output}) \quad (9A)$$

The power differential heat rate term, $hr_{Power}$, and the environmental differential heat rate term, $hr_{Envir}$, are developed through a similar relationship by substituting Eq.(7) into (9B):

$$hr_{Power}+hr_{Envir}=3412.1416\ FCI_{Power}m_{AF}(HHVP+HBC)/(1000\ W_{output}) \quad (9B)$$

$$=3412.1416\ m_{AF}(HHVP+HBC)/G_{in} \quad (10)$$

$$hr_{Power}=3412.1416 \quad (11)$$

$$hr_{Envir}=3412.1416[m_{AF}(HHVP+HBC)-G_{in}]/G_{in} \quad (12)$$

The $hr_{Power}$ term is defined constant at 3412.1416 ΔBtu/kWh, the units conversion factor. This is done for two reasons: first, the conversion factor is indicating that 3412.1416 ΔBtu/hr of exergy consumed (the potential for power) by the process of direct generation, is 1.0 kW of electricity; and second, by so defining $hr_{power}$, a mechanism is provided to the operator through $hr_{Envir}$ to emphasize the thermodynamic impact the environment plays on the system's supply streams (i.e., the input of fuel energy flow, $m_{AF}(HHVP+HBC)$, versus the input of exergy flow in $G_{in}$).

By so defining $hr_j$ terms in Eqs.(9A) and (9B), the summation of $hr_j$ for all components and processes is the First Law-based definition of unit heat rate, termed HR. This is more than a mathematical convenience since $\Sigma hr_j$ involves inherent consideration of all thermodynamic losses, the power production process and the environmental term, i.e., the entire system; this feature is critical if the operator is to receive consistent information.

$$HR = \Sigma hr_j \quad (13A)$$

$$= \Sigma hr_1 + hr_{Power} + hr_{Envir} \quad (13B)$$

$$= 3412.1416 m_{AF}(HHVP + HBC)/W_{output} \quad (13C)$$

System heat rate may also be developed directly from the computed $FCI_{Power}$ term by combining Eqs.(7), (11) and (10) into (13C), producing Eq.(14). Note that the environmental differential heat rate term may be held constant for certain situations (e.g., when fuel chemistry is stable), allowing Eq.(14) to be used for system heat rate sensitivity studies, dependent only on a variable Fuel Consumption Index for Power, determined via Eq.(7) or otherwise obtained.

$$HR = (1000/FCI_{Power})(3412.1416 + hr_{Envir}) \quad (14)$$

The FCI concept is of critical importance to the system operator. It allows the breakdown of heat rate, component by component, thus allows the monitoring of degraded equipment and the search for improved operation. It guarantees consistent $hr_j$ values. It is noteworthy that, with these concepts, the operator need not rely on vendor predictions nor the controllable parameters method to evaluate a particular component's effects on system heat rate.

Dynamic Heat Rate

Even through reliable system heat rate and consistent differential heat rates are obtainable by applying FCI techniques, which is the preferred embodiment, and even when so coupled with '711, '853, '879 and '932 methods, monitoring thermal systems with these techniques is still inadequate in all circumstances if attempting to convey to the operator the correct direction his/her actions are having on the system. This is especially true with coal-fired systems as caused by variable loads and variable fuel quality. However, through proper integration and presentation techniques, as taught by this invention, lucid time sensitive heat rates may be developed. This is achieved through Dynamic Heat Rates.

Dynamic Heat Rate is herein defined as a time weighted system heat rate, HR, based on appropriate quadrature of monitored values, and presented to the system operator in a selectively integrated manner when its slope, $\partial HR/\partial t$, indicates an improved heat rate; although the numerical magnitude of Dynamic Heat Rate is arbitrarily normalized, the rules applied for selective integration are chosen such that Dynamic Heat Rate is linearly related to actual improvements in system heat rate. Two versions of Dynamic Heat Rate are presented, differing in the details of time weights and rules of selective integration. Although the preferred embodiment employs $FCI_{Power}$ values to develop Dynamic Heat Rates, the methods presented by this invention may be applied using heat rates determined by any method, including any of the available Input/Loss methods. Although this invention is described through two versions of Dynamic Heat Rate for purposes of illustration, various modifications and enhancements may be made without departing from the spirit and scope of the invention.

To develop consistent operator information, as the preferred embodiment, $FCI_{Power}$ is integrated by quadrature based on repeated on-line monitoring evaluations, denoted as $\tilde{F}\tilde{C}\tilde{I}_{Power}$ from Eq.(15). The symbol $\tilde{F}\tilde{C}\tilde{I}_{Power}$ is termed a time weighted Fuel Consumption Index for Power.

$$\tilde{F}\tilde{C}\tilde{I}_{Power,k} = \Sigma_{k=n,\, n-1,\, n-2,\, \ldots\, n-1-M/2} \xi_k FCI_{Power,k} \quad (15)$$

Time weighted system heat rate may be developed directly from Eq.(15), the preferred embodiment, through use of Eq.(25A) as taught through Eq.(14). Or, time weighted system heat rate may be based on other heat rate method, including other Input/Loss methods, of determining system heat rate and analyzed using Eq.(25B).

$$\tilde{H}\tilde{R}_k = (3.4121416 \times 10^6 + 1000\, hr_{Envir})/\tilde{F}\tilde{C}\tilde{I}_{Power,k} \quad (25A)$$

$$\tilde{H}\tilde{R}_k = \Sigma_{k=n,\, n-1,\, n-2,\, \ldots\, n+1-M/2} \xi_k HR_k \quad (25B)$$

The variable $\xi_k$, used in Eqs.(15) and (25B), is important to this invention as it defines the time weighting function:

$$\xi_k = \cos[\pi(n-k)/M]/\Sigma \cos[\pi(n-k)/M] \quad (16)$$

In these relationships: k is the evaluated time step; n, as a time step number, is the most recently monitored evaluation; and M is the number of time steps equivalent to the system's periodicity. As presented, the time step size is uniform, it need not be uniform. For example: if M=5 and n=238, then: k=238, 237, 236, 235, 234; yielding: $\xi_k$=0.27346, 0.26007, 0.22123, 0.16074, 0.08450 (summing to unity). The weighting function may take numerous forms; it may be taken as a constant or unity (i.e., no bias). For the preferred embodiment $\xi_k$ of Eq.(16) provides bias on the most current data but influenced by smoothing of older data. Results of applying Eq.(15) may be observed in FIG. 2. For FIG. 2, M=16 was assumed as it is approximately the natural periodicity of the system in time steps (as based on FIG. 1's data, in FIG. 1 each time step is 3 minutes, the periodicity being 48 minutes). Setting M to the periodicity (in time steps) is the preferred embodiment; however, it also may otherwise be determined using sensitivity studies appropriated to a given system. Information contained in FIG. 2 may itself be useful to system operators.

$\tilde{F}\tilde{C}\tilde{I}_{Power,k}$ of Eq.(15) may be selectively integrated when its slope is positive as expressed by Eq.(17); the result $\int \partial \tilde{F}\tilde{C}\tilde{I}_{Power}$ being termed Dynamic Fuel Consumption Index for Power (analogous to Dynamic Heat Rate). When $\tilde{F}\tilde{C}\tilde{I}_{Power,k}$ is converted to system heat rate using Eq.(14) and integrated when the slope indicates improved heat rate, Dynamic Heat Rate, termed $\int \partial HR_D$, is then developed. For convenience, Eq.(19) is so defined to indicate a positive improvement in heat rate, remembering that a reduction in heat rate, or higher $\tilde{F}\tilde{C}\tilde{I}_{Power}$ term, is desired. Eq.(17) has been found by operators to be as useful as $\int \partial HR_D$. An example of a rule for selective integration, using Eq.(17), is given as: $\tilde{F}\tilde{C}\tilde{I}_{Power,k} > \tilde{F}\tilde{C}\tilde{I}_{Power,k-1}$, meaning that if this condition is met, an accumulation of $\int \partial \tilde{F}\tilde{C}\tilde{I}_{Power,n}$ is made for time step n. In these expressions the summation on m=n, n−1, n−2, . . . represents the desired period for evaluation; hourly, a work shift of 8 hours, daily, etc, where the summation occurs from the start of the evaluation, to the current time step, n, monitoring each time step on-line.

$$\int \partial \tilde{F}\tilde{CI}_{Power,n} = \Sigma_{m=n,\,n-1,\,n-2,\,\ldots}\,[\Sigma_{k=m,\,m-1,\,m-2,\,\ldots\,m+1-M/2}(\tilde{F}\tilde{CI}_{Power,k} - \tilde{F}\tilde{CI}_{Power,k-1})];$$

sum on $m$ only when: $\tilde{F}\tilde{CI}_{Power,k} > \tilde{F}\tilde{CI}_{Power,k-1}$ (17)

$$\int \partial HR_{D,\,n} = (3.4121416 \times 10^6 + 1000\,\text{hr}_{Envir}) \cdot$$

$$\Sigma_{m=n,\,n-1,\,n-2,\,\ldots}\,[\Sigma_{k=m,\,m-1,\,m-2,\,\ldots\,m+1-M/2}(1/\tilde{F}\tilde{C}\tilde{I}_{Power,k-1} - 1/\tilde{F}\tilde{C}\tilde{I}_{Power,k})];$$

sum on $m$ only when $\tilde{F}\tilde{CI}_{Power,k} > \tilde{F}\tilde{CI}_{Power,k-1}$ (18)

$$=\Sigma_{m=n,\,n-1,\,n-2,\,\ldots}\,[\Sigma_{k=m,\,m-1,\,m-2,\,\ldots\,m+1-M/2}(\tilde{HR}_{k-1} - \tilde{HR}_k)];$$

sum on $m$ only when: $\tilde{HR}_k < \tilde{HR}_{k-1}$ (19)

Figure 2:
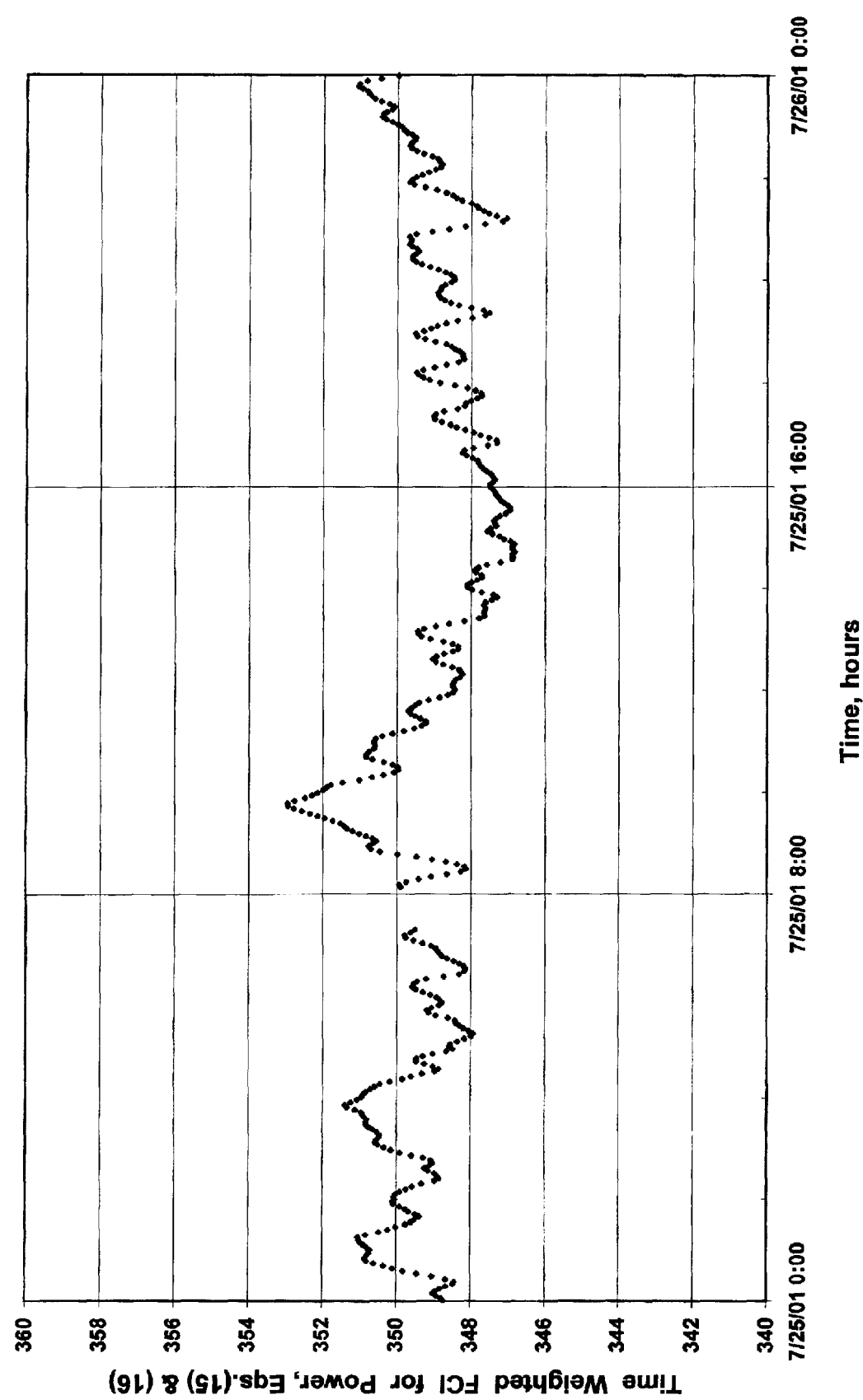
FIG. 2 is a plot of time weighted Fuel Consumption Index for power based on the data of FIG. 1.
Figure 3:
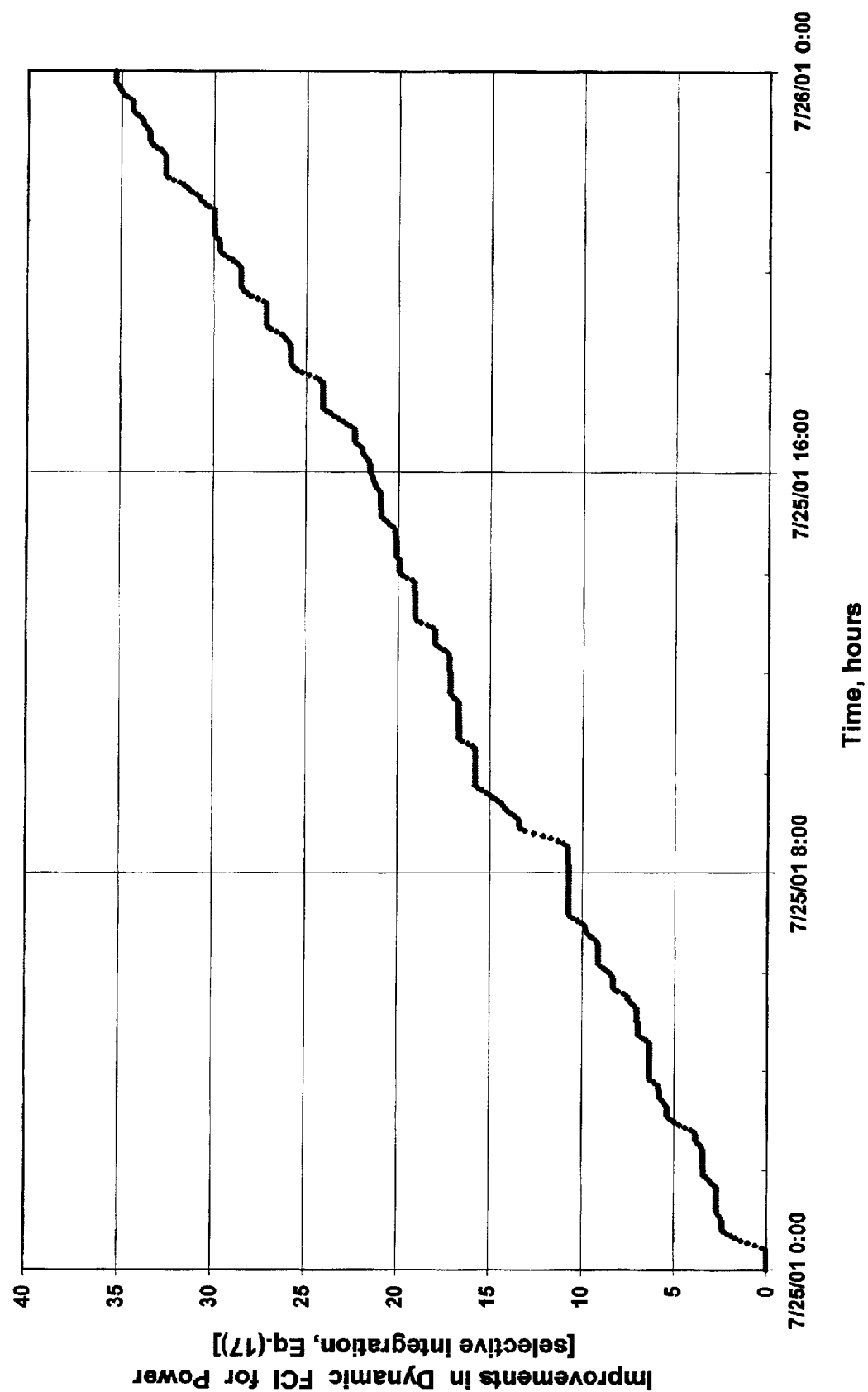
FIG. 3 is a plot of improvements in Dynamic Fuel Consumption Index for power based on the data of FIG. 2.

Applying Eq.(17) to the data of FIG. 2 results in FIG. 3 which is typical of such plots. Applying Eq.(19) to the data of FIG. 2 results in FIG. 4. As seen in these figures the use of $\int \partial \tilde{F}\tilde{CI}_{Power}$ or $\int \partial HR_D$ presents clarity when compared to FIG. 1. Presentations of data as in FIG. 3 and in FIG. 4 has been shown to be highly useful to the system operator provided the system exhibits a non-oscillatory behavior.

Figure 5:
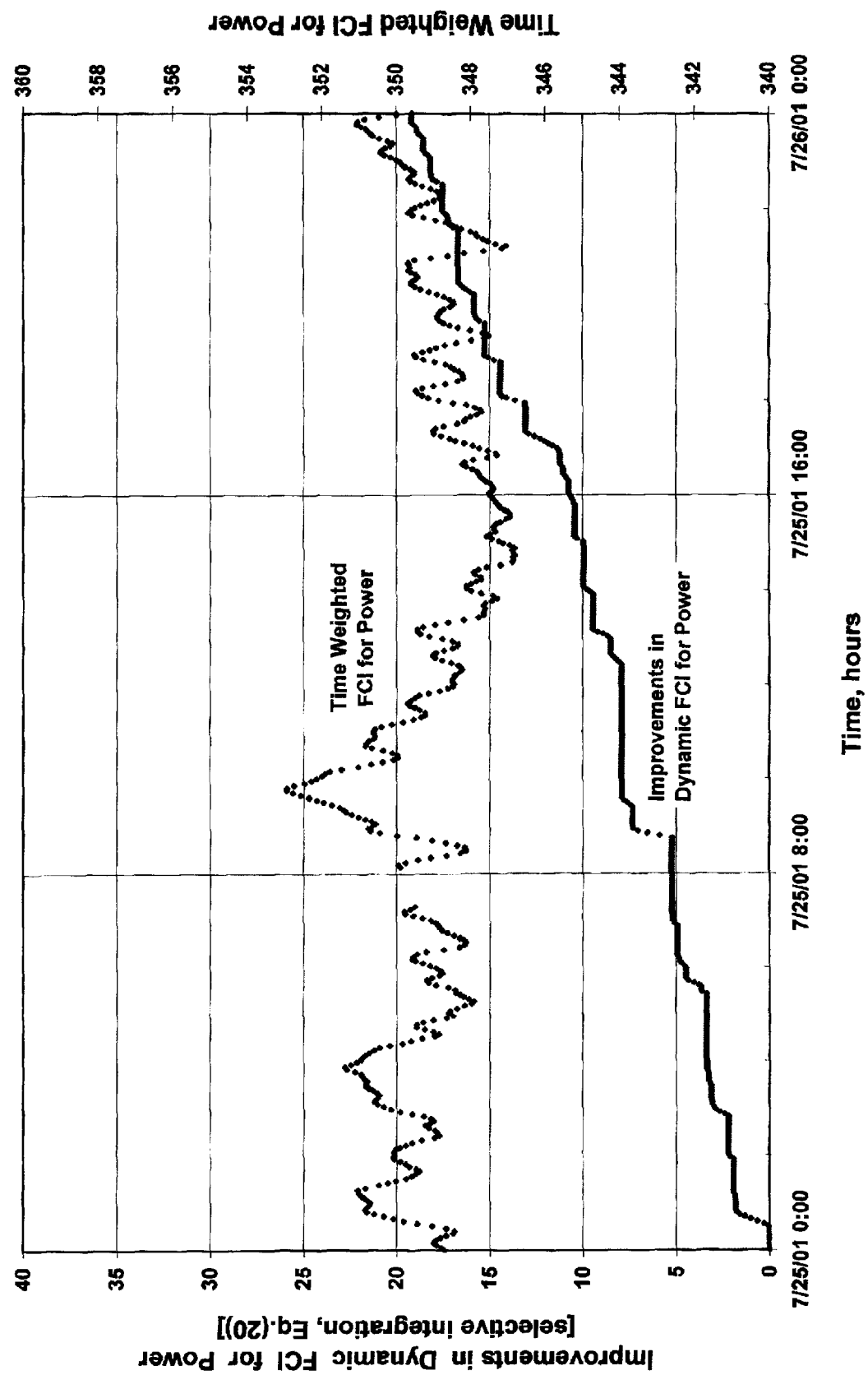
FIG. 5 is a plot of selective integration of the data of FIG. 1, also showing the data of FIG. 2.

However, as clearly observed in the last 8 hours of FIG. 2, and present in FIG. 1, the thermal system may exhibit oscillatory behavior. Although not present in all thermal systems, such oscillations are quite common in coal-fired systems. These are addressed by developing $\int \partial \tilde{F}\tilde{CI}_{Power}$ and $\int \partial HR_D$ terms based on parallel integrations, bearing in mind the natural periodicity of the system ($\lambda$). Again, the total number of time steps (M) employed for quadrature is defined by the periodicity of the system (M=$\lambda/\Delta t_k$). Eqs.(20) and (21) define the revised forms of $\int \partial \tilde{F}\tilde{CI}_{Power}$ and $\int \partial HR_D$. Having an oscillatory behavior, the integration considers off-setting quadrants (where, for each quadrant: N=M/4), the first quadrant adding to heat rate improvement given a slope indicating an improved heat rate, the second detracting given a degrading heat rate, the third detracting and the fourth adding. Also, the rules for selective integration include: a) that an improved heat rate is observed at the current evaluation (n versus n−1); b) that the first quadrant's integration is greater than the fourth, thus an improved heat rate over one cycle; and c) that the total cycle evaluation is an improvement. In these expressions to simplify nomenclature, the symbol $\Sigma_{k1}$, for example when used in Eq.(21), represents the value resultant from the corresponding summation: $\Sigma_{k1=m,\,m-1,m-2,\,\ldots\,m-N+1}(\tilde{HR}_{k1-1} - \tilde{HR}_{k1})$.

$$\int \partial \tilde{F}\tilde{CI}_{Power} = \qquad (20)$$

$$\Sigma_{m=n,n-1,n-2,\ldots}\,[\Sigma_{k1=m,m-1,m-2,\ldots\,m-N+1}(\tilde{F}\tilde{CI}_{Power,k1} - \tilde{F}\tilde{CI}_{Power,k1-1}) -$$

$$\Sigma_{k2=m-N,m-N-1,\ldots\,m-2N+1}(\tilde{F}\tilde{CI}_{Power,k2} - \tilde{F}\tilde{CI}_{Power,k2-1}) -$$

$$\Sigma_{k3=m-2N,m-2N-1,\ldots\,m-3N+1}(\tilde{F}\tilde{CI}_{Power,k3} - \tilde{F}\tilde{CI}_{Power,k3-1}) +$$

$$\Sigma_{k4=m-3N,m-3N-1,\ldots\,m-4N+1}(\tilde{F}\tilde{CI}_{Power,k4} - \tilde{F}\tilde{CI}_{Power,k4-1})]S_F/2;$$

sum on $m$ only when: $\tilde{F}\tilde{CI}_{Power,k1} > \tilde{F}\tilde{CI}_{Power,k1-1}$ and: $\Sigma_{k1} > \Sigma_{k4}$ and: $\Sigma_{k1} - \Sigma_{k2} - \Sigma_{k3} + \Sigma_{k4} > 0.00$ $$\int \partial HR_D = \Sigma_{m=n,n-1,n-2,\ldots}\,[\Sigma_{k1=m,m-1,m-2,\ldots\,m-N+1}(\tilde{HR}_{k1-1} - \tilde{HR}_{k1}) - \qquad (21)$$

$$\Sigma_{k2=m-N,m-N-1,\ldots\,m-2N+1}(\tilde{HR}_{k2-1} - \tilde{HR}_{k2}) -$$

$$\Sigma_{k3=m-2N,m-2N-1,\ldots\,m-3N+1}(\tilde{HR}_{k3-1} - \tilde{HR}_{k3}) +$$

$$\Sigma_{k4=m-3N,m-2N-1,\ldots\,m-4N+1}(\tilde{HR}_{k4-1} - \tilde{HR}_{k4})]S_H/2;$$

sum on $m$ only when: $\tilde{HR}_{k1} < \tilde{HR}_{k1-1}$ and: $\Sigma_{k1} > \Sigma_{k4}$ and: $\Sigma_{k1} - \Sigma_{k2} - \Sigma_{k3} + \Sigma_{k4} > 0.00$ Typically for large coal-fired power plants periodicity may vary from 15 to 90 minutes. Periodicity, if present, must be determined unique to the system being monitored; however, typically a simple examination of $\tilde{F}\tilde{CI}_{Power}$ data of Eq.(15) will often reveille the periodicity. For FIG. 2 oscillatory behavior is observed during the last 8 hours, from which a periodicity is deduced at approximately 48 minutes, thus M=16, N=4, given $\Delta t_k$=3 minute constant time steps. Use of Eq.(20) on the data of FIG. 2 results in FIG. 5. Over-plotted in FIG. 5 is the originating data from FIG. 2. Note that the selective integration methods results in weighing only the net improvements from one cycle to the next. Use of Eq.(21) on the data of FIG. 2, as converted to heat rate, results in FIG. 6. Further, time weighted functions, although applied in Eqs.(20) and (21) through Eq.(16), could also be applied directly to each integration quadrant, assuming $\xi_k$=1.00 and $\tilde{F}\tilde{CI}_{Power,k}$=FCI$_{Power,k}$. The quantities $S_F$ and $S_H$ are arbitrary, constant, scaling factors, established by convenience for presentation; for FIG. 5 $S_F$=0.3333, for FIG. 6 and FIG. 7 $S_H$=1.0000.

A further useful teaching of this invention is to present trends to the system operator, defined as pre-determined anticipated Dynamic Heat Rates versus time. It has been found that each operator has unique adjustment characteristics and reactions to system controls which may effect system heat rate. Thus, information of FIG. 6 may be presented in such a manner which compares one work shift against another, creating competition for the highest improvements in Dynamic Heat Rate. FIG. 7 presents such a comparison for three work shifts of 8 hours each. Similar presentations may be applied for $\int \partial \tilde{F}\tilde{CI}_{Power}$ of FIG. 3, or $\int \partial \tilde{F}\tilde{CI}_{Power}$ of FIG. 5, or $\int \partial HR_D$ of FIG. 4. In FIG. 7 a targeted Dynamic Heat Rate versus time is over-plotted with actual data and resultant slopes. The chosen target is 300 $\Delta$Btu/kWh of Dynamic Heat Rate per day, or 100 $\Delta$Btu/kWh per 8 hour work shift. Such targets must be uniquely established for a given thermal system and its fuel, and based on the selective integration employed, and its associated rules. However, experience has shown that if employing the selective integration of Eq.(21), 300 $\Delta$Btu/kWh per day has been found to be reasonable for coal-fired systems burning Powder River Basin coal. As can be seen, Shift A and Shift B fall short of the target (even with the system being off-line from 07:20 to 08:11); while Shift C has beat the target by over 37%. The deviations indicated in FIG. 7 are determined based on the work shift's starting point and the average improvement as the shift progresses; deviations being based on the actual average slope at any given time compared to the targeted slope.

The Remote Engine

The Remote Engine is a computer, typically a personal computer, which receives data electronically from the Calculational Engine. The Remote Engine, or an engineer using the Remote Engine, digests this data and then advises the system operator of appropriate corrections, improvements and warnings which improve system operations. Such digestion of data may involve only computer programming within the Remote Engine, for example routine checks of trip points (such as high computed tube failure flow rates). If only computer programming is required to develop appropriate diagnostic information, then its communications back to the Calculational Engine is automated. On the other hand, such digestion of data may require an experienced power engineer's examination of the data record afforded from the Calculational Engine, in addition to possible extra sensitivity studies and applied engineering judgement. The nature of the data received from the Calculational Engine includes all data available from one of the Input/Loss methods. Communications back to the system operator may involve verbal communication between the experienced power engineer (having reviewed data on the Remote Engine), and/or automated electronic messaging from the Remote Engine to the Calculational Engine. This communicative process is termed On-Line Advisory Diagnostics.

As a minimum, the data received by the Remote Engine from the Calculational Engine may include only system heat rate and/or Fuel Consumption Index for Power produced from any on-line method including '470 and '420, and/or the alternative methods taught by '956 and '061.

In the preferred embodiment, the data received by the Remote Engine from the Calculational Engine includes all significant data from The Input/Loss Method as taught in '711, '853, '879 and '932. Specifically, for the preferred embodiment, such might include any one or all of the following:

As-Fired file chemistry including fuel water and ash taught by '711,

As-Fired heat value taught by '711,

As-Fired fuel flow taught by '711,

Mass flow balances for the thermal system taught by '711,

Energy flow balances for the thermal system taught by '711,

System heat rate taught by '711 as influenced by boiler efficiency as taught by '853, Turbine Cycle heat rate taught by '711, Boiler efficiency taught by '853, Stoichiometric balances for the thermal system taught by '853 and, when the tube failure model is invoked, '932, Routine operating parameters taught by '879, Flow rates of individual pollutants taught by '879, Emission rates of pollutants taught by '879, Total effluent volumetric flow rate taught by '879, Computed L Factors for the As-Fired fuel taught by '879, Numerical convergence of the Objective Function as taught by '879, Correction Factors to system effluent measurements, including Correction Factors to Choice Operating Parameters taught by '879, System Effect Parameters taught by '879, Heat exchanger tube failure mechanism taught by '932, Computed heat exchanger tube failure flow rate taught by '932, Fuel Consumption Index for Power taught by this invention, Fuel Consumption Indices for all major components and processes in the system taught by this invention, Dynamic Fuel Consumption Index for Power taught by this invention, and Dynamic Heat Rate taught by this invention.

Summary

Although the present invention has been described in considerable detail with regard to certain preferred embodiments thereof, other embodiments within the scope of the present invention are possible without departing from the spirit and general industrial applicability of the invention. Accordingly, the general theme and scope of the appended claims should not be limited to the descriptions of the preferred embodiment disclosed herein.

THE DRAWINGS

FIG. 1 is a plot of actual Fuel Consumption Index for power ($FCI_{Power}$) values produced from a Calculational Engine using The Input/Loss Method described in '711, '853, '879 and '932, installed at a 600 MWe coal-fired power plant. FIG. 1 presents 24 hours of data, picked from a typical day, divided into three 8 hour periods (work shifts); the Engine produced $FCI_{Power}$ values approximately once every 3 minutes. The system was off-line from 07:20 to 08:11.

FIG. 2 is a plot of time weighted $FCI_{Power}$ values based on the data of FIG. 1 as processed employing Eqs.(15) and (16), thus producing the quantity $\widetilde{FCI}_{Power,k}$ as shown. The variable $\xi_k$, as the time weighting function of Eq.(16), was employed using M=16.

FIG. 3 is a plot of accumulated improvements in Dynamic Fuel Consumption Index for Power, $\int \partial \widetilde{FCI}_{Power}$, as based on the data of FIG. 2 and processed using Eq.(17).

Figure 4:
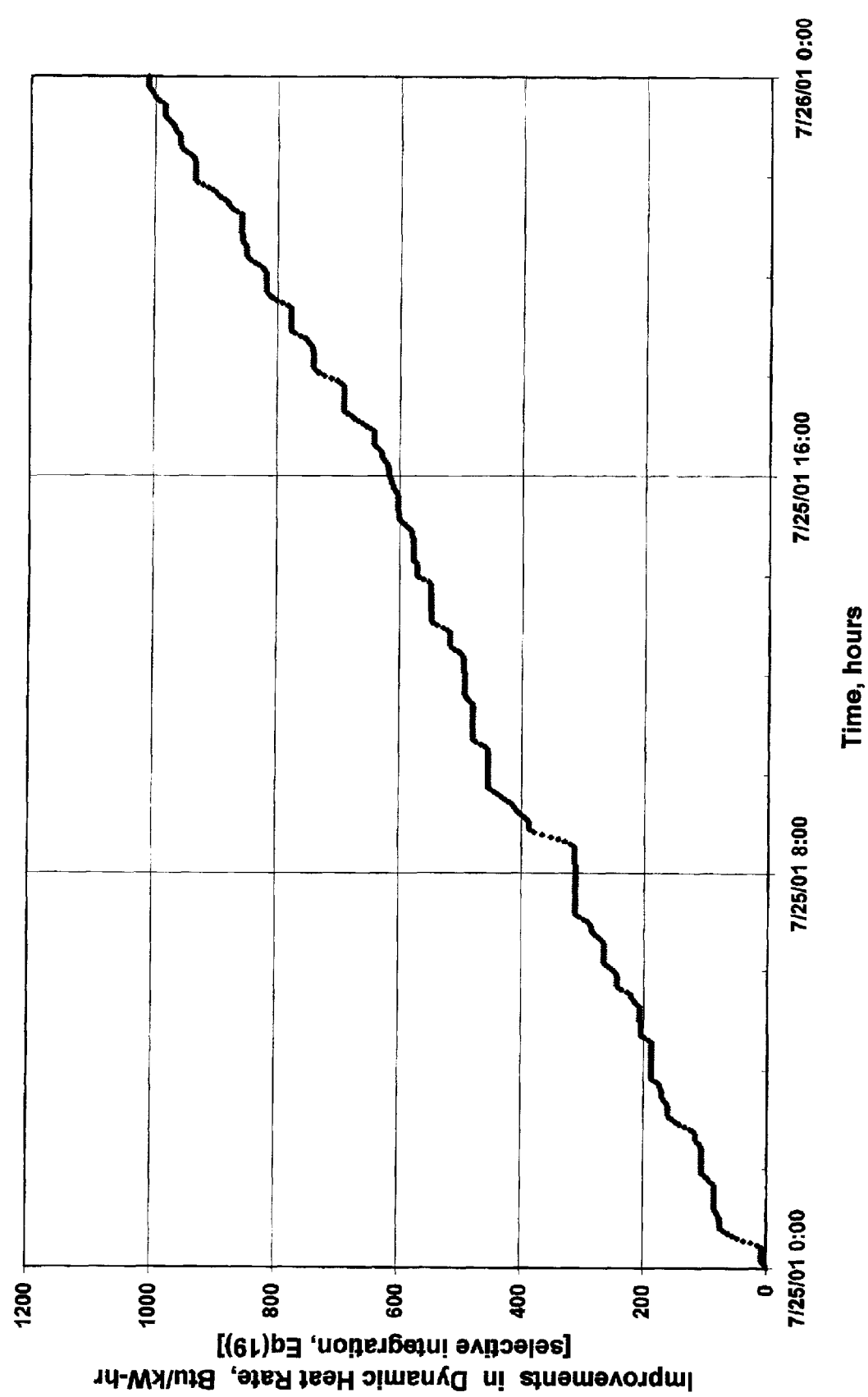
FIG. 4 is a plot of improvements in Dynamic Heat Rate based on the data of FIG. 2.

FIG. 4 is a plot of accumulated improvements in Dynamic Heat Rate, $\int \partial HR_D$, as based on the data of FIG. 2 and processed using Eq.(19).

FIG. 5 is both a re-plot of FIG. 2, the time weighted Fuel Consumption Index for Power, and the accumulated improvements in Dynamic Fuel Consumption Index for Power, $\int \partial \widetilde{FCI}_{Power}$, as based on the data of FIG. 2 and using Eq.(20). Note both the correlation and the lack of correlation, between the time weighted FCI values (the base data of FIG. 2), and its interpretation using selective integration of Eq.(20).

Figure 6:
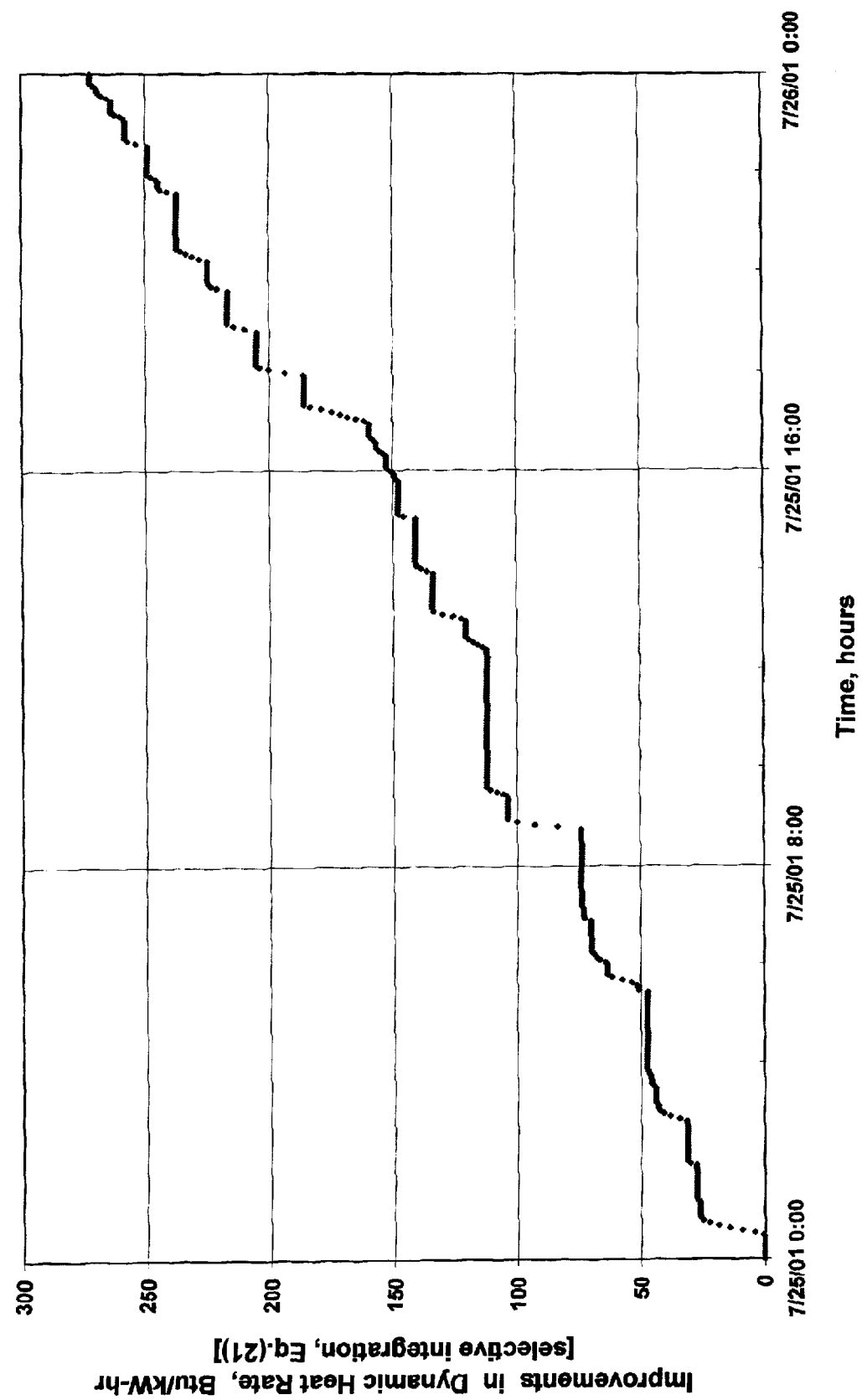
FIG. 6 is a plot of a full integration of the data of FIG. 1 in terms of Dynamic Heat Rate.
Figure 7:
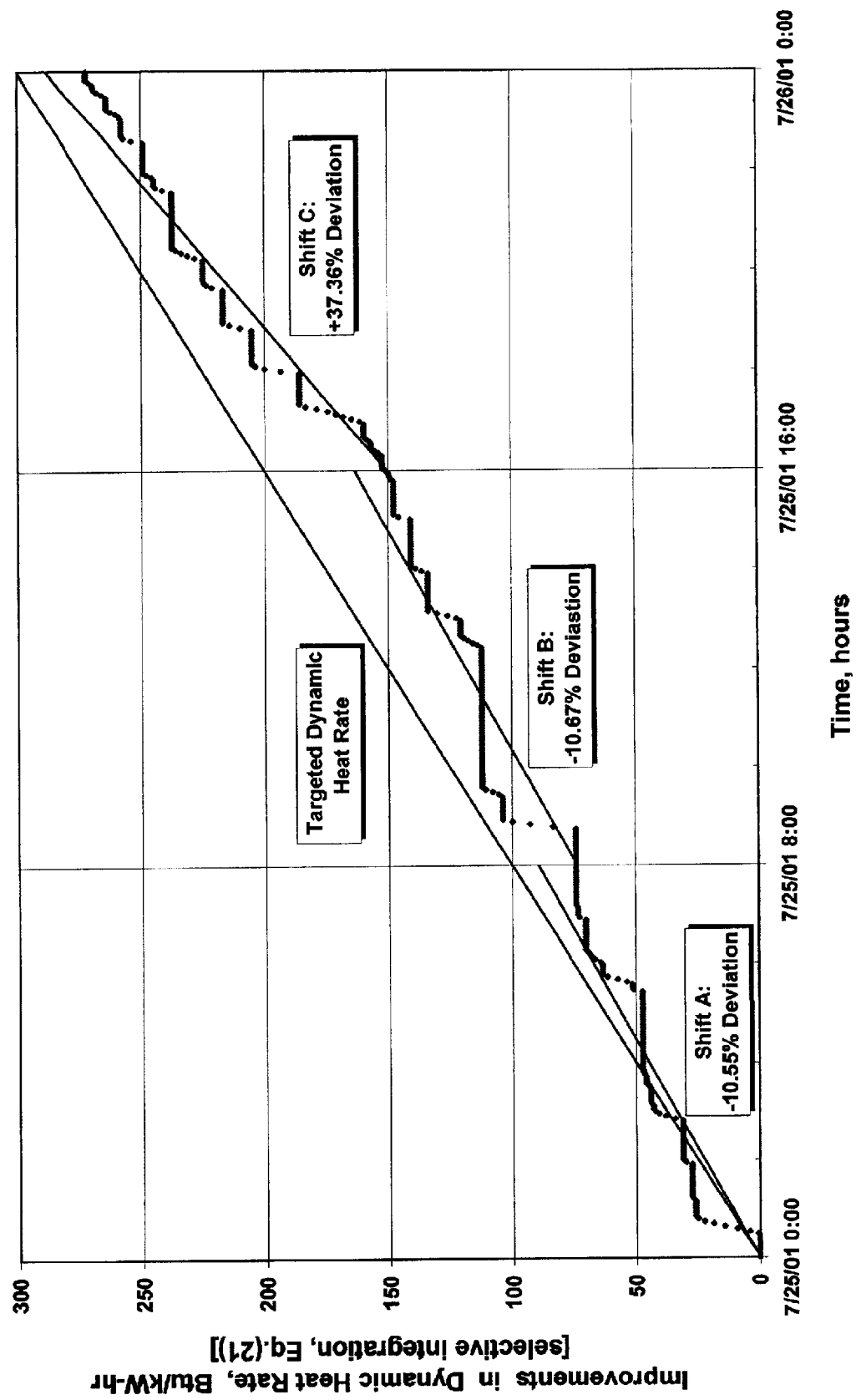
FIG. 7 is the same plot as FIG. 6, but showing the results of individual work shifts, a targeted slope, and the actual slopes produced during each work shift.

FIG. 6 is a plot of accumulated improvements in Dynamic Heat Rate, $\int \partial HR_D$, as based on the data of FIG. 2 and processed using Eq.(21).

FIG. 7 is a re-plot of FIG. 6 with over-plots of targeted Dynamic Heat Rate assuming 300 ΔBtu/kWh per day improvement and showing the actual achievements of each of the three work shifts (A, B and C). Percent deviations between the actual slopes and the targeted indicates the degree of success each work shift obtained in improving system heat rate. Note the considerable difference in achievements between shift C and shifts A and B.

Figure 8:
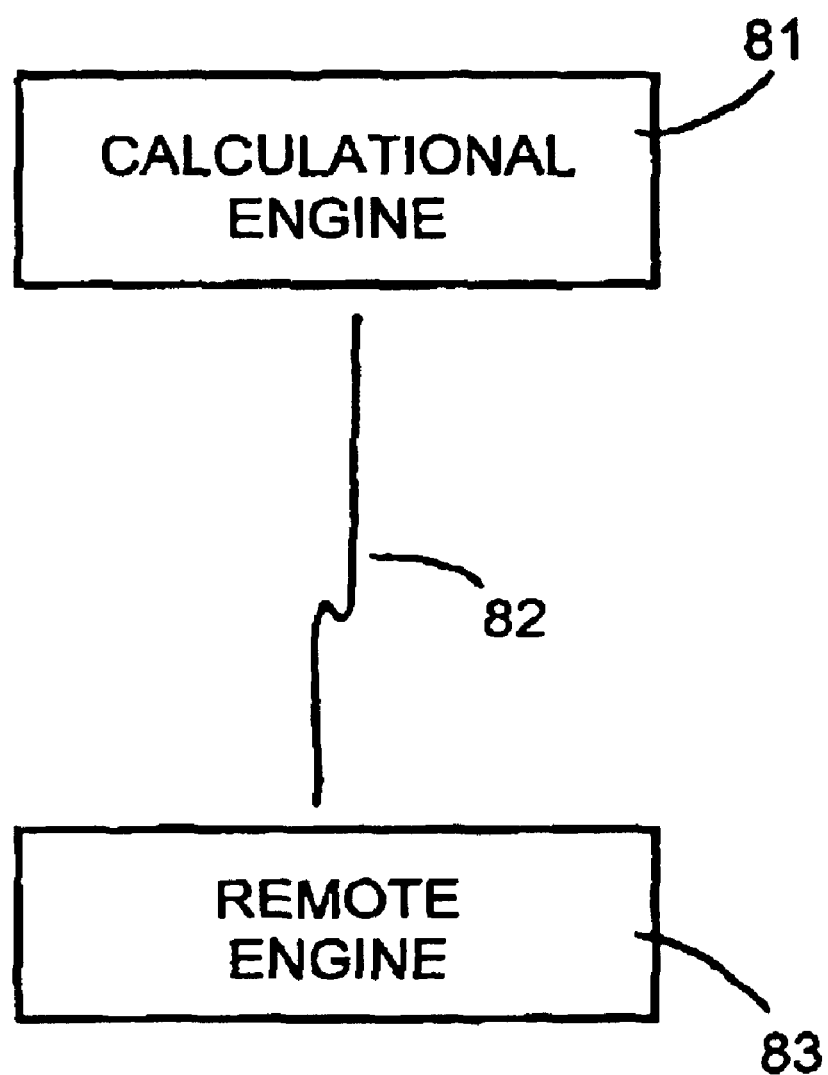
FIG. 8 is a block diagram showing the Calculational and Remote Engines.

FIG. 8 is a block diagram representing the Calculational Engine 81 located at the thermal system, communicating 82 with a Remote Engine 83 located anywhere. Communication 82 may take any form including, but not limited to, electronic mail, internet connection, facsimile, direct phone communication, electronic modem, satellite communication, and/or by semaphore.

For FIG. 1 and elsewhere if used, the words "obtain", "obtained", "obtaining", "determine", "determined", "determining" or "determination" are defined as measuring, calculating, computing by computer, assuming estimating or gathering from a database. The words "establish", "established" or "establishing" are defined as measuring, calculating, computing by computer, assuming, estimating or gathering from a database.

For FIG. 1 and elsewhere herein, the words "monitoring" or "monitored" is meant to encompass both on-line monitoring (i.e., processing system data in real time) and off-line monitoring (i.e., computations involving static data).

For FIG. 1 and elsewhere herein, the meaning of the words "Operating Parameters" refers in general to common data obtained from a thermal system applicable to the thermodynamic understanding of that system. The following quantities are included in the definition of Operating Parameters, they are not encompassing but considered typical of a minimum set of data required for thermodynamic understanding. Effluent $CO_2$, $O_2$, and $SO_2$ concentrations are determined at the Stack, or before the air heater (Boiler side of the air pre-heater). The mass, wet-base ratio of the "indicated" combustion air flow at the system's fuel combustors, to the system's "indicated" fuel flow, termed $AF_{Act}$, should be determined. Measurements comprising the Air/Fuel ratio could be made on a volume base, or a dry-base, then converted. Effluent $H_2O$ concentration measurement is required, or assumptions made (or otherwise determined), and as dependent on Reference Fuel Characteristics. Effluent temperature measurement is required, that is the average temperature associated with the combustion gases at the system boundary (caution must be exercised in measuring non-stratified gas flows). The inlet/outlet ratio of $CO_2$ (preferred), CO, or $O_2$ across the air pre-heater (these could be obtained off-line, based on periodic testing or judgement), is used for the determination of air pre-heater leakage using the $R_{Act}$ and $\beta$ terms. Determination of fuel temperature at an appropriate system boundary is required. Air psychometric measurements are required, or as otherwise determined, at the system boundary (e.g., dry and wet bulb temperatures, or dry bulb and relative humidity). The discharge temperatures of the air as it exits each air heating or cooling device (but before it reacts with the fuel) are required; for example, such devices might include the air pre-heater, forced-draft fan, steam-to-air heater, etc. Measurements are required to determine the total energy flow deposition to the working fluid from the combustion gases. For a power plant, such measurements typically include feedwater flow to the steam generator, feedwater pressure and temperature, determination of the steam flow from the steam generator if different than the feedwater flow, steam pressure, steam temperature or quality (or assumed quality), and, if applicable, reheat flows, and reheat inlet and outlet pressures and temperatures. For a conventional power plant, determination of accurate reheat flows generally requires understanding of steam turbine flow distributions (involving high pressure turbine shaft seals, steam flows to feedwater heaters, bypass leakages, attemperation spray flows and the like). Note that further discussion and definition of the symbols $AF_{Act}$, $R_{Act}$ and $\beta$, and further discussion of Operating Parameters, is presented in '711, '853, '879 and '932.

As used herein, the meaning of the words "Input/Loss methods" refers to any method or combination of method in which one or more of the following parts is determined based on one or more Operating Parameters: fuel flow, effluent flow, emission rates, fuel chemistry, fuel heating value, boiler efficiency, system heat rate, Fuel Consumption on Indices and/or the Fuel Consumption Index for Power. The several Input/Loss methods include the methods of '470 and '420. The words "The Input/Loss Method" refers specifically to the collection of technologies described in '711, '853, '879, '932 and in their related provisional patent applications and Continuation-in-Parts. The words "other heat rate methods" refers to technologies described in '956 and '061, and also refers to technologies which produce system heat rate and/or a Fuel Consumption Index for Power, or quantities of a similar nature.

What is claimed is:

1. A method for quantifying the operation of a fossil-fired thermal system which produces a gross electrical generation, through its system heat rate and other thermal performance parameters when its fuel chemistry, fuel heating value and fuel flow are determined from any one of the available Input/Loss methods being executed on a Calculational Engine, the method for quantifying the operation comprising the steps of:

before on-line operation of the Calculational Engine, the steps of developing a time weighting function applicable to the data collection methods associated with the thermal system, determining a natural periodicity of the thermal system; and thereafter operating the Calculational Engine on-line, the steps of operating on-line including the steps of obtaining a set of Operating Parameters appropriate to the understanding of the thermal system, including the gross electrical generation, exercising a selected method from one of the available Input/Loss methods resulting in fuel chemistry, fuel heating value and fuel flow, computing a total exergy flow and shaft power input to the thermal system based on the set of Operating Parameters and results from the selected Input/Loss method, calculating a Fuel Consumption Index for Power based on the gross electrical generation and the total exergy flow and shaft power input to the thermal system, and determining a time weighted Fuel Consumption Index for Power based on the time weighting function and the natural periodicity of the thermal system if appropriate.

2. The method of claim 1, wherein the step of exercising the selected method includes the step of exercising a selected method which is The Input/Loss Method resulting in fuel chemistry, fuel heating value and fuel flow.

3. The method of claim 1, wherein the step of obtaining the Fuel Consumption Index for Power includes the step of obtaining a set of Fuel Consumption Indices based on the set of Operating Parameters and results from the selected Input/Loss method.

4. The method of claim 1, wherein the step of before on-line operation includes the additional step, of establishing a set of selective integration rules to be applied to data obtained while on-line; and wherein the step of operating the Calculational Engine on-line includes the additional step, of determining a Dynamic Fuel Consumption Index for Power based on the set of selective integration rules and the time weighted Fuel Consumption Index for Power.

5. The method of claim 1, wherein the step of operating the Calculational Engine on-line includes the additional step, after the step of determining the time weighted Fuel Consumption Index for Power, of reporting the time weighted Fuel Consumption Index for Power for the purpose of understanding the thermal system and improving system heat rate.

6. The method of claim 5, wherein the step of reporting the time weighted Fuel Consumption Index for Power, within the step of operating the Calculational Engine on-line, includes the step of communicating with a Remote Engine data from the Calculational Engine, such data to include the time weighted Fuel Consumption Index for Power for the purpose of understanding the thermal system and improving system heat rate.

7. The method of claim 4, wherein the step of operating the Calculational Engine on-line includes the additional step, after the step of determining the Dynamic Fuel Consumption Index for Power, of reporting the Dynamic Fuel Consumption Index for Power for the purpose of understanding the thermal system and improving system heat rate.

8. The method of claim 1, wherein the step of operating the Calculational Engine on-line includes the additional steps, after the step of determining the time weighted Fuel Consumption Index for Power, of obtaining an environmental differential heat rate, obtaining a system heat rate based on the environmental differential heat rate and the Fuel Consumption Index for Power, and reporting the system heat rate for the purpose of understanding and improving the thermal system.

9. The method of claim 1, wherein the step of operating the Calculational Engine on-line includes the additional steps, after the step of determining the time weighted Fuel Consumption Index for Power, of obtaining an environmental differential heat rate, obtaining a time weighted system heat rate based on the environmental differential heat rate and the time weighted Fuel Consumption Index for Power, and reporting the time weighted system heat rate for the purpose of understanding and improving the thermal system.

10. A method for quantifying the operation of a fossil-fired thermal system which produces a gross electrical generation, through a system heat rate and other thermal performance parameters when its fuel chemistry, fuel heating value and fuel flow are determined from any one of the available Input/Loss methods being executed on a Calculational Engine, the method for quantifying the operation comprising the steps of:

before on-line operation of the Calculational Engine, the steps of developing a time weighting function applicable to the data collection methods associated with the thermal system, determining a natural periodicity of the thermal system; and thereafter operating the Calculational Engine on-line, the steps of operating on-line including the steps of obtaining a set of Operating Parameters appropriate to the understanding of the thermal system, including the gross electrical generation, exercising a selected method from one of the available Input/Loss methods resulting in a fuel energy flow of the thermal system, calculating the system heat rate based on the gross electrical generation and the fuel energy flow of the thermal system, and determining a time weighted system heat rate based on the system heat rate, the time weighting function and the natural periodicity of the thermal system if appropriate.

11. The method of claim 10, wherein the step of exercising the selected method includes the step of exercising a selected method which is The Input/Loss Method resulting in the fuel energy flow of the thermal system.

12. The method of claim 10, wherein the step of obtaining the system heat rate includes the steps of obtaining a set of Fuel Consumption Indices based on the set of Operating Parameters and results from the selected Input/Loss method, obtaining a set of differential heat rates based on the set of Fuel Consumption Indices, the set of Operating Parameters, and results from the selected Input/Loss method.

13. The method of claim 10, wherein the step of before on-line operation includes the additional step, of establishing a set of selective integration rules to be applied to data obtained while on-line; and wherein the step of operating the Calculational Engine on-line includes the additional step, of determining a Dynamic Heat Rate based on the set of selective integration rules and the time weighted system heat rate.

14. The method of claim 13, wherein the step of operating the Calculational Engine on-line includes the additional step, after the step of determining the Dynamic Heat Rate, of reporting the Dynamic Heat Rate for the purpose of understanding the thermal system and improving system heat rate.

15. The method of claim 10, wherein the step of operating the Calculational Engine on-line includes the additional step, after the step of determining the time weighted system heat rate, of reporting the time weighted system heat rate the purpose of understanding the thermal system and improving system heat rate.

16. The method of claim 15, wherein the step of reporting the time weighted system heat rate, within the step of operating the Calculational Engine on-line, includes the step of communicating with a Remote Engine data from the Calculational Engine, such data to include the time weighted system heat rate for the purpose of understanding the thermal system and improving system heat rate.

* * * * *

UNITED STATES PATENT AND TRADEMARK OFFICE
CERTIFICATE OF CORRECTION

PATENT NO.    : 6,799,146 B1
DATED         : September 28, 2004
INVENTOR(S)   : Fred D. Lang It is certified that error appears in the above-identified patent and that said Letters Patent is hereby corrected as shown below:

Column 1,
Lines 11, 25 and 33, delete "in tun" and insert -- in turn --

Column 4.
Line 49, delete "stack tempers" and insert -- stack temperature --

Column 6,
Line 22, delete "as revealed" and insert -- reveal --
Line 44, delete "a personal" and insert -- a personal computer --

Column 7,
Lines 44-45, delete "The first nomenclature" and insert -- The first describes nomenclature --
Line 46, delete "disc Fuel" and insert -- describes Fuel --
Line 47, delete "as the" and insert -- as they --

Column 8,
Lines 11-12, the embedded equations and description should read
-- $HR$ = System heat rate (HHV- or LHV-based), $HR$ is also termed unit heat rate; Btu/kWh.
  $HR \equiv 3412.1416 / \eta_{system}$ --
Line 67, delete "realized power when" and insert -- realized power --

Column 9,
Line 24, delete "problems of" and insert -- solution to --
Equation (4) should read as follows:

-- $G_{in} = m_{AF}g_{Fuel} + m_{Air}g_{Air} + \sum G_{Misc} + \sum W_{Pump} + \sum W_{Fan}$   (4) --

Column 11,
Equation (13B) should read as follows:

-- $HR = \sum hr_i + hr_{Power} + hr_{Envir}$         (13B) --

Line 52, delete "its slope, aHR/at," and insert -- its slope, $\partial HR/\partial t$, --

UNITED STATES PATENT AND TRADEMARK OFFICE
CERTIFICATE OF CORRECTION

PATENT NO. : 6,799,146 B1
DATED : September 28, 2004
INVENTOR(S) : Fred D. Lang

It is certified that error appears in the above-identified patent and that said Letters Patent is hereby corrected as shown below:

Column 12,
Equation (15) should read as follows: $-- \widetilde{\overline{FCI}}_{Power, k} = \sum_{k=n, n-1, n-2, \ldots n-M+1} \xi_k \, FCI_{Power, k} \quad (15) --$ Equation (25B) should read as follows: $-- \widetilde{\overline{HR}}_k = \sum_{k=n, n-1, n-2, \ldots n-M+1} \xi_k \, HR_k \quad (25B) --$ Equation (16) should read as follows: $-- \xi_k = cos\,[\pi(n-k)/(2M)] / \sum cos\,[\pi(n-k)/(2M)] \quad (16) --$ Lines 49-50, delete the broken expression: "the result $\int \partial \overline{F}$" and "$\widetilde{CI}_{Power}$", and insert -- the result $\int \partial \widetilde{\overline{FCI}}_{Power}$ --

Column 23,
Lines 1-29, including Equations (17), (18) and (19): should read as follows:

$$-- \int \partial \widetilde{\overline{FCI}}_{Power, n} = \sum_{m=n, n-1, n-2,\ldots} [\sum_{k=m, m-1, m-2, \ldots m-M+1} (\widetilde{\overline{FCI}}_{Power, k} - \widetilde{\overline{FCI}}_{Power, k-1})] ;$$
$$\text{sum on m only when: } \widetilde{\overline{FCI}}_{Power, k} > \widetilde{\overline{FCI}}_{Power, k-1} \quad (17)$$

$$\int \partial HR_{D, n} = (3.4121416 \times 10^6 + 1000\, hr_{Envir})$$
$$\cdot \sum_{m=n, n-1, n-2,\ldots} [\sum_{k=m, m-1, m-2, \ldots m-M+1} (1/\widetilde{\overline{FCI}}_{Power, k-1} - 1/\widetilde{\overline{FCI}}_{Power, k})] ;$$
$$\text{sum on m only when: } \widetilde{\overline{FCI}}_{Power, k} > \widetilde{\overline{FCI}}_{Power, k-1} \quad (18)$$
$$= \sum_{m=n, n-1, n-2,\ldots} [\sum_{k=m, m-1, m-2, \ldots m-M+1} (\widetilde{\overline{HR}}_{k-1} - \widetilde{\overline{HR}}_k)] ;$$
$$\text{sum on m only when: } \widetilde{\overline{HR}}_k < \widetilde{\overline{HR}}_{k-1} \quad (19) --$$

Lines 50-51, delete "when used in Eq.(21)," and insert -- when used in the description following Eq.(21), --

Column 17,
Line 2, delete "combination of method" and insert -- combination of methods --

Signed and Sealed this

Twenty-sixth Day of April, 2005

JON W. DUDAS
*Director of the United States Patent and Trademark Office*